US012626518B2

(12) United States Patent
Brems et al.

(10) Patent No.: US 12,626,518 B2
(45) Date of Patent: May 12, 2026

(54) METHOD TO DETECT LANE SEGMENTS FOR CREATING HIGH DEFINITION MAPS

(71) Applicant: FORD GLOBAL TECHNOLOGIES, LLC, Dearborn, MI (US)

(72) Inventors: Willibald Brems, Ingolstadt (DE); Francesco Ferroni, Munich (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 549 days.

(21) Appl. No.: 18/074,204

(22) Filed: Dec. 2, 2022

(65) Prior Publication Data

US 2024/0185617 A1     Jun. 6, 2024

(51) Int. Cl.
| | |
|---|---|
| *G06V 20/00* | (2022.01) |
| *G06V 10/764* | (2022.01) |
| *G06V 10/82* | (2022.01) |
| *G06V 20/56* | (2022.01) |
| *G06V 20/70* | (2022.01) |

(52) U.S. Cl.
CPC .......... *G06V 20/588* (2022.01); *G06V 10/764* (2022.01); *G06V 10/82* (2022.01); *G06V 20/70* (2022.01)

(58) Field of Classification Search
CPC .... G06V 20/588; G06V 10/764; G06V 10/82; G06V 20/70; G01C 21/3815
See application file for complete search history.

(56) References Cited

U.S. PATENT DOCUMENTS

| | | | |
|---|---|---|---|
| 10,859,395 B2 | 12/2020 | Wheeler et al. | |
| 10,997,433 B2 | 5/2021 | Xu et al. | |
| 11,182,624 B2 | 11/2021 | Zhang et al. | |
| 12,097,875 B1 * | 9/2024 | Lukarski | ............... G06V 10/80 |
| 2017/0369057 A1 * | 12/2017 | Gurghian | ................ G06N 3/08 |
| 2018/0188059 A1 * | 7/2018 | Wheeler | ................ G06T 17/05 |

(Continued)

FOREIGN PATENT DOCUMENTS

| | | |
|---|---|---|
| CN | 100516776 | 7/2009 |
| CN | 109976332 | 7/2019 |

(Continued)

OTHER PUBLICATIONS

He et al, RoadTagger: Robust Road Attribute Inference with Graph Neural Networks, ARXIV ID: 1912.12408 (Year: 2019).*

(Continued)

*Primary Examiner* — Xiao Liu
(74) *Attorney, Agent, or Firm* — Frank A. MacKenzie; Brooks Kushman P.C.

(57) ABSTRACT

Disclosed herein are system, method, and computer program product embodiments for detecting lane segments in an image for creating high-definition (HD) maps. A neural network can be used to classify a pixel of an image of a location as belonging to a driving lane. If the pixel belongs to a first boundary line of the driving lane, it is labeled accordingly. Based on the labeled pixel and one or more additional labeled pixels as part of the first boundary line of the driving lane, a first line drawing of the first boundary line of the driving lane is constructed. A lane segment based on a combination of the first line drawing of the first boundary line of the driving lane and a second line drawing of a second boundary line of the driving lane can be created.

15 Claims, 17 Drawing Sheets

(56)                    References Cited

U.S. PATENT DOCUMENTS

| 2021/0001877 | A1  | 1/2021  | Han et al. |
| 2021/0208588 | A1  | 7/2021  | Gray et al. |
| 2022/0355825 | A1* | 11/2022 | Deo .................. B60W 50/0097 |

FOREIGN PATENT DOCUMENTS

| CN | 108151751 | 4/2020 | |
| WO | WO-2024081141 A1 * | 4/2024 | ........ B60W 30/0956 |

OTHER PUBLICATIONS

Liu, J., Cai, B., Wang, Y. and Wang, J., 2013. Generating Enhanced Intersection Maps for Lane Level Vehicle Positioning Based Applications. Procedia-Social and Behavioral Sciences, 96, pp. 2395-2403. https://doi.org/10.1016/j.sbspro.2013.08.268.

Zhang, T., Yang, D., Li, T., Li, K. and Lian, X., 2011. An improved virtual intersection model for vehicle navigation at intersections. Transportation research part C: emerging technologies, 19(3), pp. 413-423. Retrieved from https://dlwqtxts1xzle7.cloudfront.net/ 47365328/An_improved_virtual_intersection_mode 1_f20160719-2141-1it0yfq-libre.pdf?1468978134=&response-content-disposition= inline%3B+filename%3DAn_improved_virtual_intersection_model_ f.pdf&            Expires=1651759062&Signature= T6jOOk12r74snJDG4QpHtlgGojYCQKCid4UMIi8gGaQQxBxN-W1Xj-B1AsnQfF9AbGNHrjOJ6srn~QxTnwXYq1GTGkDiOzI7 P8tMk0-wR~VDnlMlnH5w8Z7NOWZ2~w22pKmwe01jfYDi6vlu UW4Q4aeoDW9jq6sNdxMtK2qf9JWJUeKTQlfmofIvRIozzLWi6d 6xK1KFmgXY28aouxBm5n~oKBcVYYbTZHMkk~u6v4u0ROav XNgmdSw40P8eVqQX6h~1Eb2xAE8s2Km14Za1L2xBOXEtQ7d zovFXuODkRg 0DRVnboO-mba2nPjpzMakfQMuWW9n-ght9~53vBtCA_&Key-Pair-Id=APKAJLOHF5GGSLRBV4ZA.

* cited by examiner

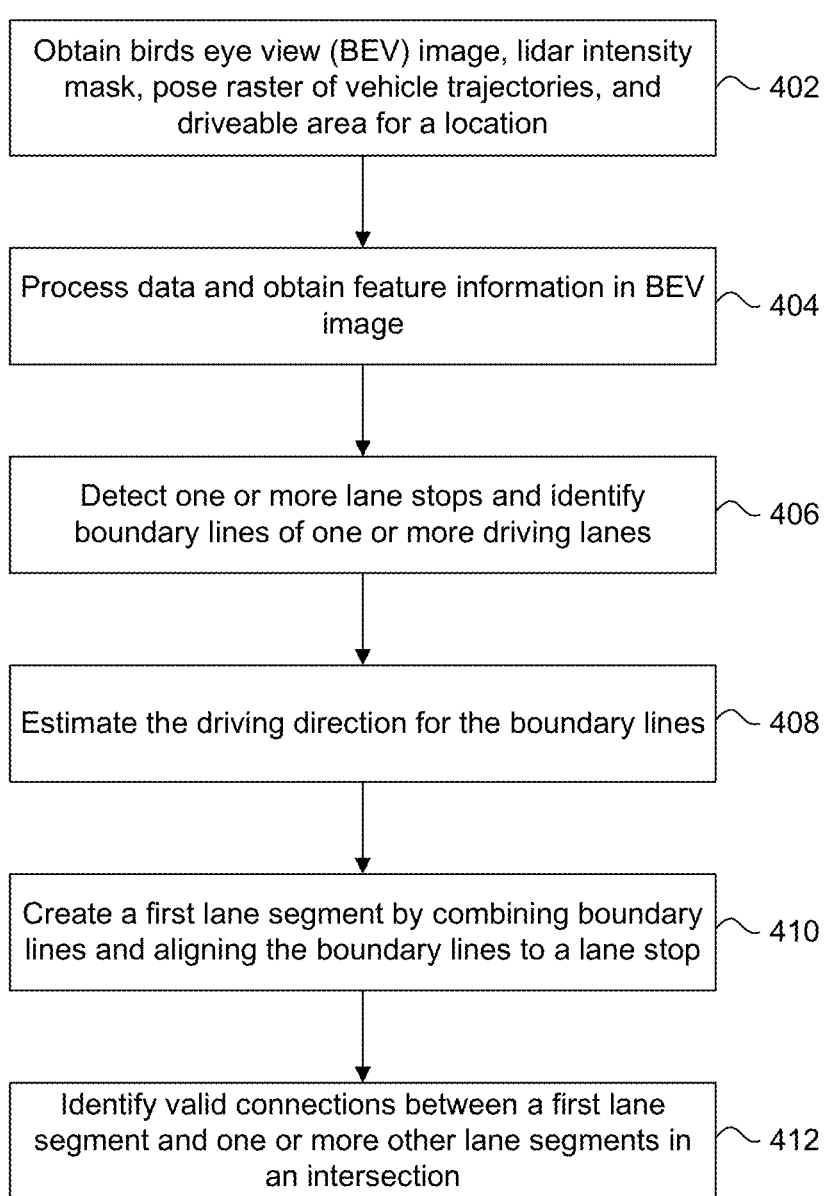

400

Obtain birds eye view (BEV) image, lidar intensity mask, pose raster of vehicle trajectories, and driveable area for a location — 402

Process data and obtain feature information in BEV image — 404

Detect one or more lane stops and identify boundary lines of one or more driving lanes — 406

Estimate the driving direction for the boundary lines — 408

Create a first lane segment by combining boundary lines and aligning the boundary lines to a lane stop — 410

Identify valid connections between a first lane segment and one or more other lane segments in an intersection — 412

Figure 5:
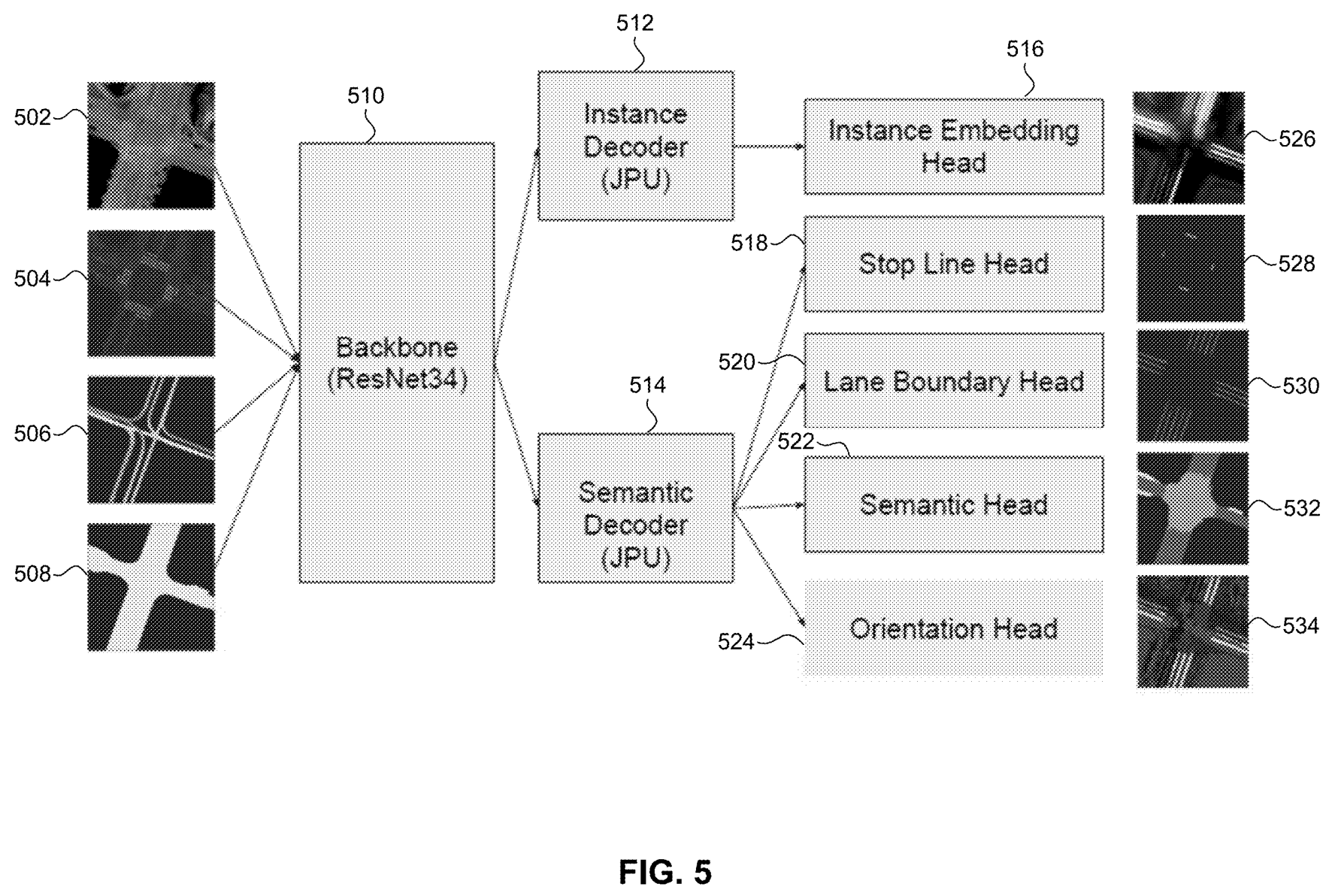

Instance Embedding Head

Stop Line Head

Lane Boundary Head

Semantic Head

Orientation Head

518

520

522

524

512

Instance Decoder (JPU)

514

Semantic Decoder (JPU)

510

Backbone (ResNet34)

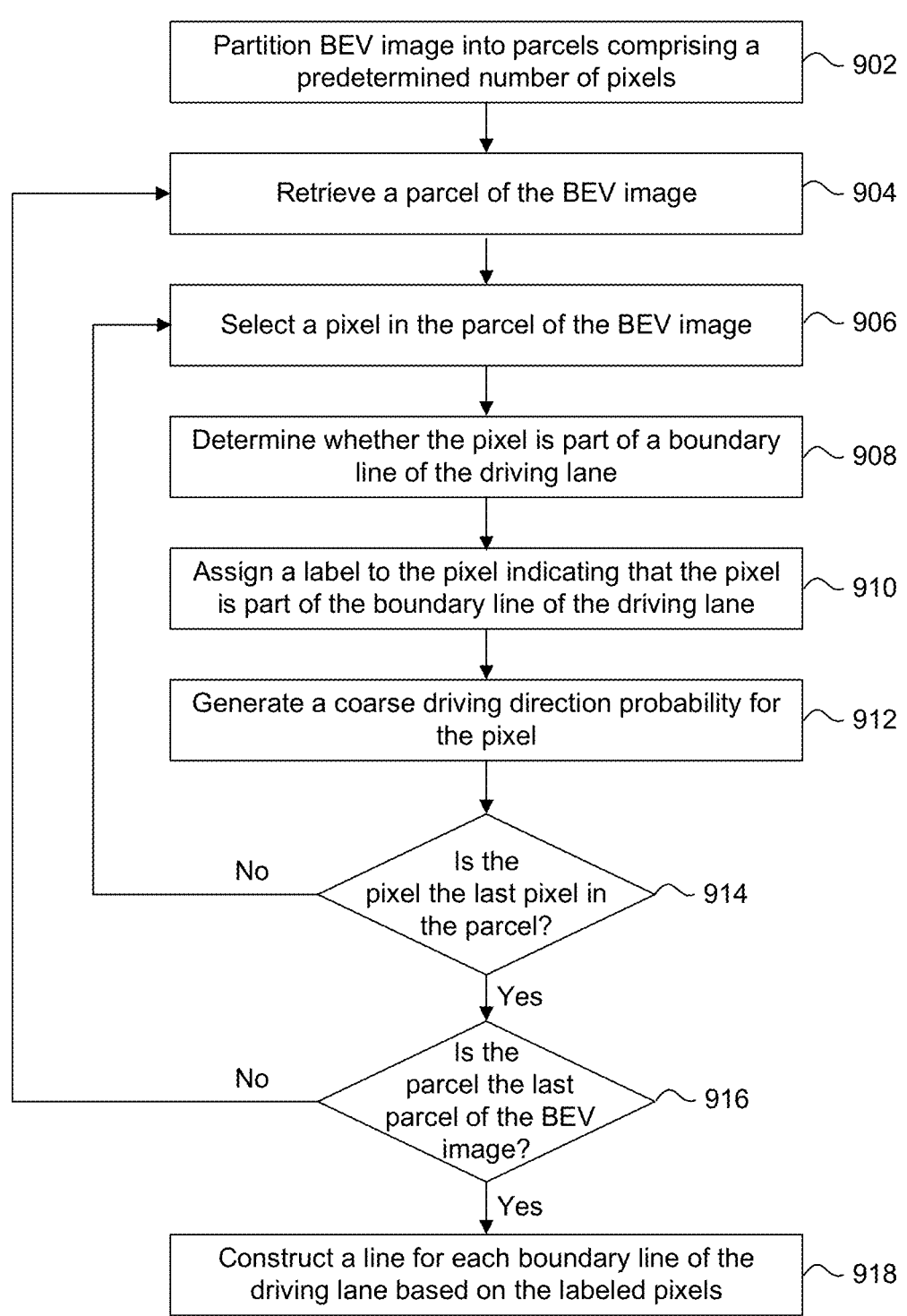

900

Partition BEV image into parcels comprising a predetermined number of pixels — 902

Retrieve a parcel of the BEV image — 904

Select a pixel in the parcel of the BEV image — 906

Determine whether the pixel is part of a boundary line of the driving lane — 908

Assign a label to the pixel indicating that the pixel is part of the boundary line of the driving lane — 910

Generate a coarse driving direction probability for the pixel — 912

Is the pixel the last pixel in the parcel? — 914    No

Yes

Is the parcel the last parcel of the BEV image? — 916    No

Yes

Construct a line for each boundary line of the driving lane based on the labeled pixels — 918

FIG. 9

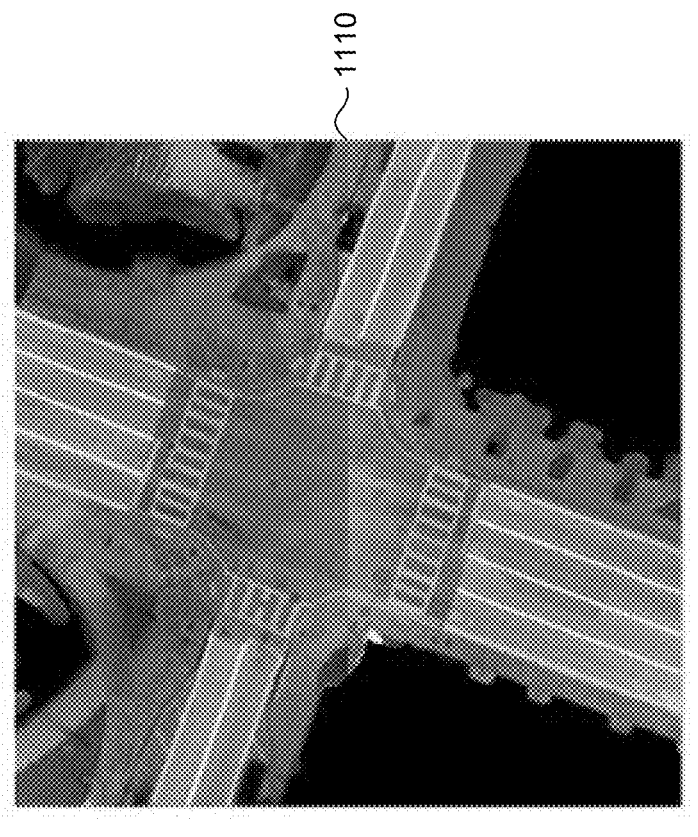
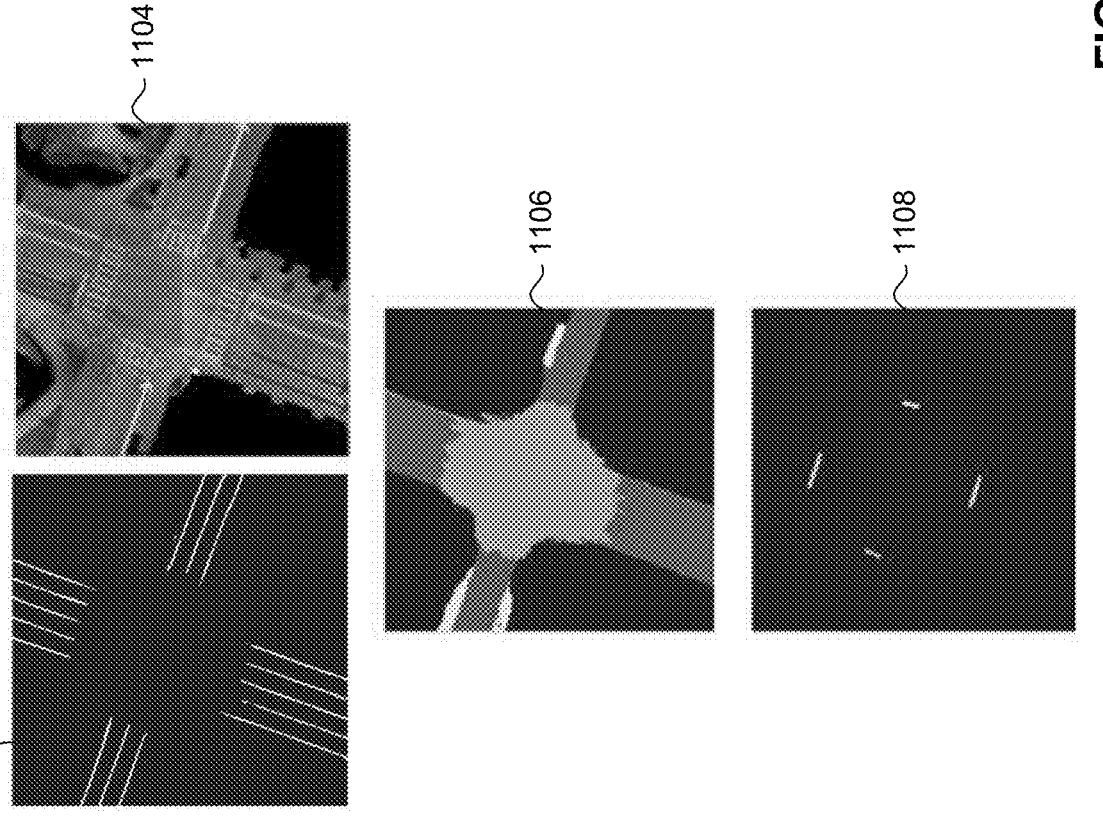
FIG. 11

1200

Model the lane segments as a graph ~ 1202

Identify potential connections between lane segments ~ 1204

Generate an existence likelihood for each potential connection between lane segments ~ 1206

Identify the potential connection as a valid connection when the existence likelihood exceeds a predetermined threshold ~ 1208

METHOD TO DETECT LANE SEGMENTS FOR CREATING HIGH DEFINITION MAPS

BACKGROUND

Autonomous vehicles (AVs) can be configured to operate autonomously and navigate their environment with little or no human input. In order to do so safely, AVs may use high definition (HD) maps in combination with various sensors that collect real-time data about roadways, surrounding vehicles, and other objects or actors they may encounter. HD maps are typically highly precise roadmaps that may contain information about lane boundaries, lane stops, intersections, pedestrian crossings, stop signs, and traffic signs. AVs use the information in HD maps to assist with localization and to navigate their environment on a lane-level basis.

The time and costs to generate HD maps remain a significant challenge. Current solutions for automating HD map creation often rely on neural network models that operate in the image space to detect lane segments in images. Although these models can predict straight lane segments, they often fail to detect lane segments in an intersection. Intersections often include different lanes that can be in the same location or overlap. However, for models that operate in the image space (e.g., classical object detection and segmentation), there can be no overlap between lanes or other objects. Accordingly, what is needed are improved approaches for detecting lane segments for creating HD maps.

SUMMARY

Aspects disclosed herein generally relate to methods, systems, and computer program products for detecting lane segments used to create high-definition (HD) maps. Aspects related to classifying, by a neural network on one or more computing devices, a pixel of an image including a birds eye view (BEV) of a location as belonging to a driving lane. Based on the pixel being determined to belong to a first boundary line of the driving lane by the neural network on the one or more computing devices, a label is assigned indicating the pixel as part of the first boundary line of the driving lane. Based on the labeled pixel and one or more additional labeled pixels as part of the first boundary line of the driving lane, a first line drawing of the first boundary line of the driving lane is constructed. A lane segment based on a combination of the first line drawing of the first boundary line of the driving lane and a second line drawing of a second boundary line of the driving lane is created.

BRIEF DESCRIPTION OF THE DRAWINGS

The accompanying drawings are incorporated herein and form a part of the specification.

FIG. 4 illustrates a flow chart of an example method for detecting lane segments used to create HD maps, in accordance with aspects of the disclosure.

FIG. 5 illustrates an exemplary lane detection model, in accordance with aspects of the disclosure.

FIG. 9 illustrates a flow chart of an example method for obtaining feature information in a BEV image, in accordance with aspects of the disclosure.

FIG. 11 illustrates an example method for creating lane segments based on outputs produced by the model heads of the exemplary lane detection model, in accordance with aspects of the disclosure.

FIG. 13 illustrates an exemplary architecture for the lane graph prediction model, in accordance with aspects of the disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
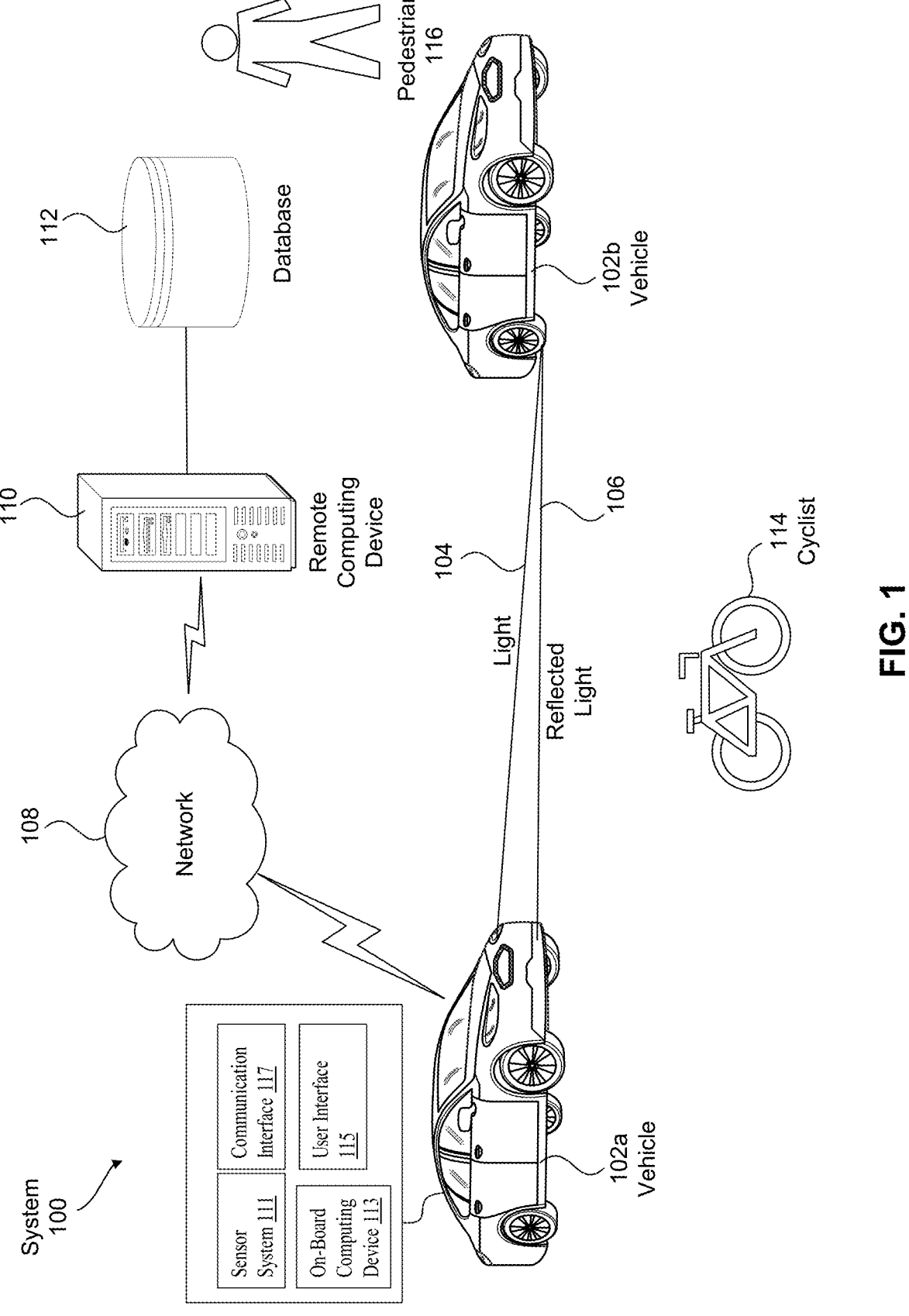
FIG. 1 illustrates an exemplary autonomous vehicle system, in accordance with aspects of the disclosure.

Provided herein are system, apparatus, device, method and/or computer program product embodiments, and/or combinations and sub-combinations thereof, for detecting lane segments for creating high-definition (HD) maps.

Autonomous vehicles (AVs) can be configured to operate autonomously and navigate their environment with little or no human input. AVs use an array of sensors to collect real-time data about their environment such as roadways, surrounding vehicles, and other objects or actors they may encounter. One or more machine learning algorithms in AVs make driving decisions based on the real-time data. Although sensors such as light detection and ranging (lidar) and cameras alert AVs to actors or objects in their path, their utility is limited to only what is visible at any given moment.

Accordingly, in order to operate safely in their environment, AVs also use HD maps. HD maps are highly precise and data rich roadmaps that may contain information about lane boundaries, lane stops, intersections, pedestrian crossings, stop signs, and traffic signs. AVs use the information in HD maps to accurately navigate on a lane-level basis and to assist with localization. HD maps also provide an additional level of redundancy that could prove particularly useful in situations where a sensor in the array of sensors fails.

The time and costs required to create HD maps remain a significant challenge. Initial methods to create and maintain HD maps (e.g., using a fleet of special-purpose vehicles to survey an area) are expensive and require extensive human involvement. Current solutions for automating the creation of HD maps predict lane segments using a neural network that operates in the image space. However, the current solutions produce unwanted gaps between adjacent lane segments and cannot predict curved lane segments. Furthermore, these solutions cannot accurately predict lane segments for intersections.

Aspects described herein provide an improved method and system to detect one or more lane segments for creating of HD maps. The disclosed invention provides a two-step HD map automation process that addresses the aforementioned technological problems. The first step may comprise using a first neural network, operating on one or more computing devices, to predict at least three different properties for each pixel of an image. The first neural network may predict whether a pixel is part of a boundary line separating two driving lanes; whether the pixel is classified as either lane, intersection, or non-drivable; and a coarse driving direction for the pixel. In some aspects, the first neural network may also predict which lane instance the pixel belongs. Although this feature is not necessary for the general algorithm, it may facilitate faster processing. The one or more computing devices may process the outputs from the first neural network to create a set of accurate boundary lines. The one or more computing devices may further combine one or more boundary lines to form a lane segment. The second step may comprise using a second neural network to predict if two of the lane segments previously created during the first step should be connected via additional lane segments. Unlike the first neural network in the first step, the second neural network operates outside of the image space and treats lanes and roads like a graph. By treating lanes and roads like a graph, the second step of the HD map automation process may comprise creating lane segments in intersections as well as additional lane segments in areas that were not initially created at the first step.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
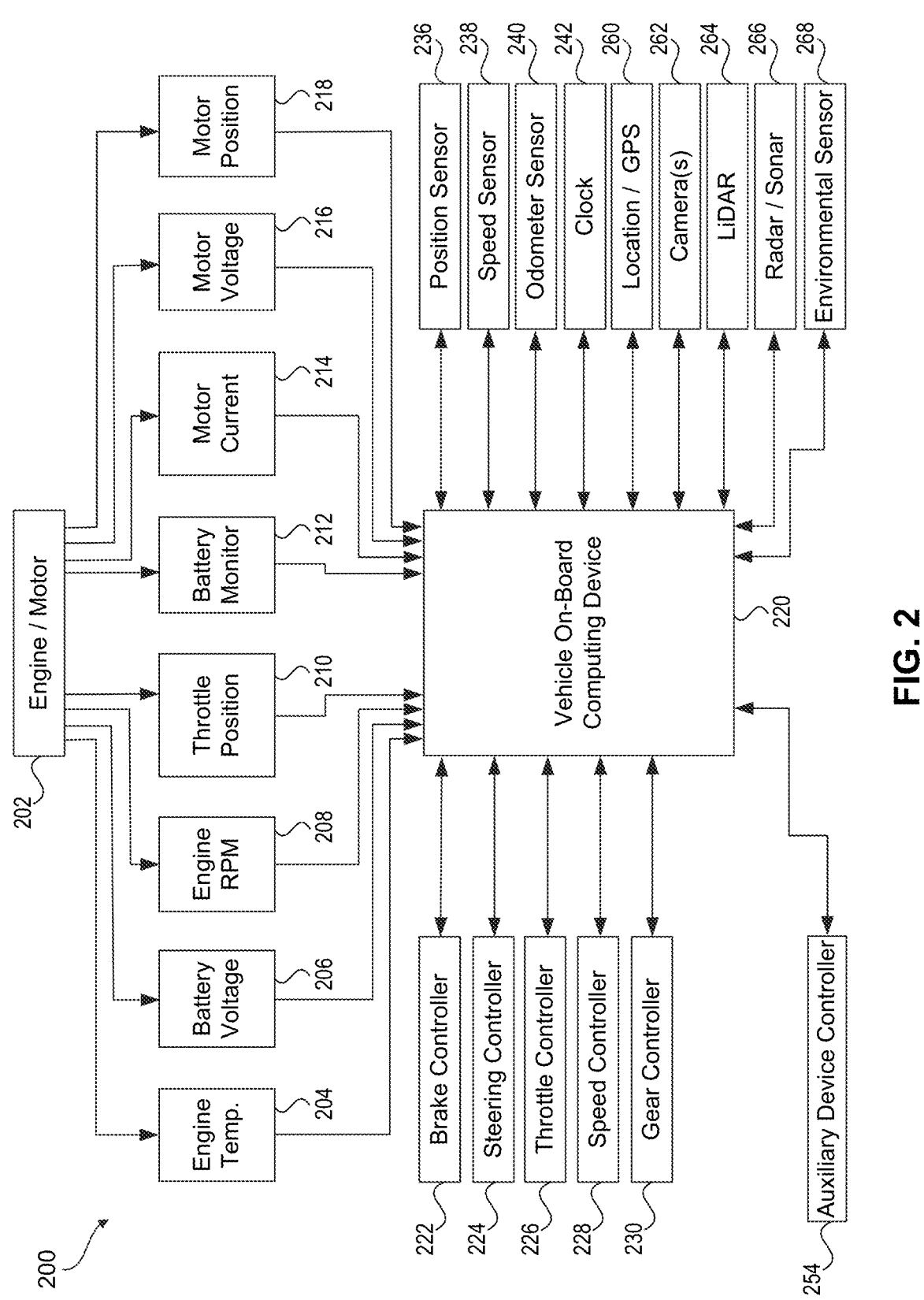
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 17. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route.

Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
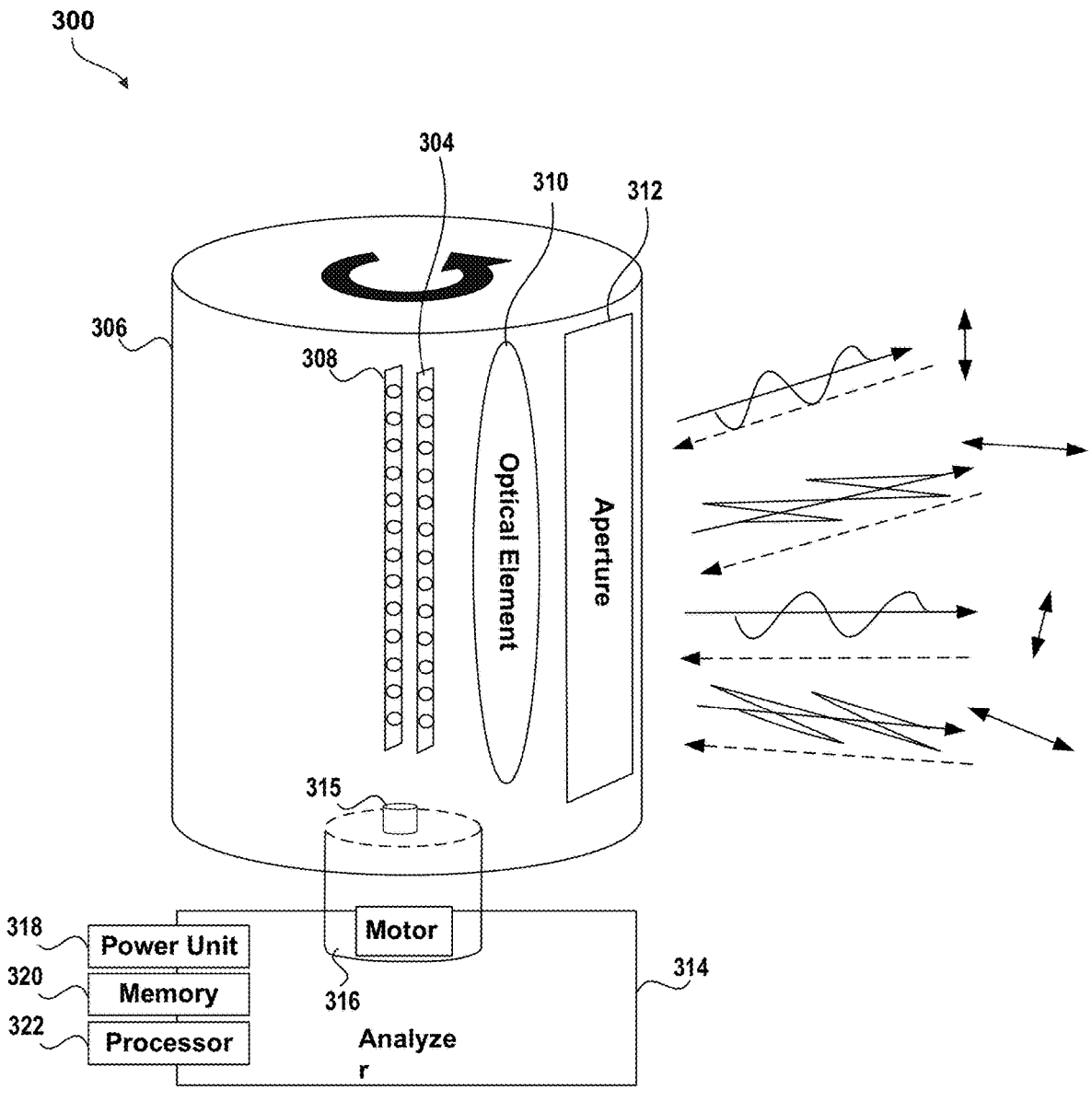
FIG. 3 illustrates an exemplary architecture for a Light Detection and Ranging ("lidar") system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

FIG. 4 illustrates a flow chart of example method 400 for detecting lane segments used to create HD maps, in accordance with aspects of the disclosure. According to one or more embodiments of this disclosure, the example method 400 may be implemented by a first neural network and a second neural network operating on one or more computing devices.

The method 400 may begin with block 402, which may include obtaining a birds eye view (BEV) image of a location comprising one or more roadways from a database. In at least one embodiment, block 402 of the method 400 may also include retrieving additional inputs such as a lidar intensity readings, past vehicle trajectories, and drivable area polygons for the respective location. Although retrieval of the additional inputs is optional and not required for the algorithm to function, the additional inputs may improve performance of the algorithm.

Block 404 of the method 400 may include processing the inputs and obtaining feature information in the BEV image. Obtaining feature information in the BEV image may include using a first neural network to predict properties for each pixel in the BEV image. In at least one embodiment, the first neural network may be a convolutional neural network that is trained to predict at least three different properties for each pixel in the BEV image. The first neural network may predict whether a pixel is part of a boundary line. The first neural network may also predict whether the pixel is classified as part of lane, intersection, or non-drivable area. The first neural network may further predict a coarse driving direction for the pixel. Predicting a coarse driving direction for a pixel may include determining a probability for each direction bin in a set of direction bins and identifying the coarse driving direction based on a comparison of the two direction bins with the highest probabilities. In at least one embodiment, the set of direction bins may comprise eight direction bins organized in 45 degree increments. The first neural network may also predict which lane instance the pixel belongs. The method for obtaining feature information in a BEV image is described in further detail at FIG. 9.

Block 406 of the method 400 may include detecting one or more lane stops and identifying boundary lines of one or more driving lanes. In some embodiments, the first neural network may be trained to additionally predict whether a pixel in the BEV image is part of a lane stop. Based on the pixel being determined as belonging to a lane stop, the first neural network may further assign a label to the pixel indicating that the pixel is part of a lane stop. Detecting one or more lane stops may include creating one or more line drawings using the pixels that the first neural network previously labeled as part of a lane stop. Furthermore, identifying boundary lines of one or more driving lanes may include creating a set of accurate line drawings using the pixels that the first neural network previously labeled as part of a boundary line at block 404.

Block 408 of the method 400 may include estimating the driving direction for the boundary lines. Estimating a driving direction for a boundary line may entail aggregating the coarse driving direction predictions for the labeled pixels on the boundary line and comparing the probabilities for the two most likely directions for the boundary line. For example, similarity between the probabilities for the two most likely directions of a boundary line may indicate that the boundary line is a lane divider that separates two lanes going in different directions. On the other hand, if the probabilities are highly different, the direction of the boundary line is the direction associated with the greatest probability.

Block 410 of the method 400 may include creating a lane segment by combining boundary lines and aligning the boundary lines to a detected lane stop. Creating a lane segment by combining the boundary lines and aligning the boundary lines to a detected lane stop may further include applying different heuristics or boundary conditions to the constructed boundary lines. The different heuristics or boundary conditions may include requirements that the lane polygons must highly overlap the lane class from the semantic head, that lane width is limited, and that lane boundary directions must be similar for both lines forming the lane segment.

Block 412 of the method 400 may include using a second neural network to identify valid connections between a first lane segment and other lane segments in an intersection. The method for identifying valid connections between a first lane segment and one or more other lane segments in an intersection is described in further detail at FIG. 12.

Figure 6:
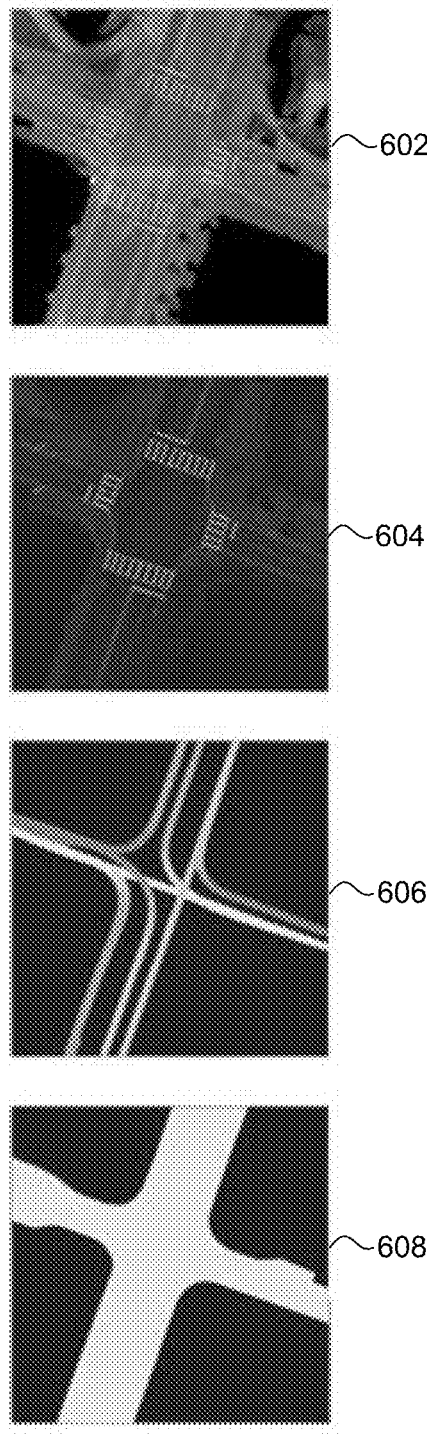
FIG. 6 illustrates example input channels for the exemplary lane detection model, in accordance with aspects of the disclosure.
Figure 7:
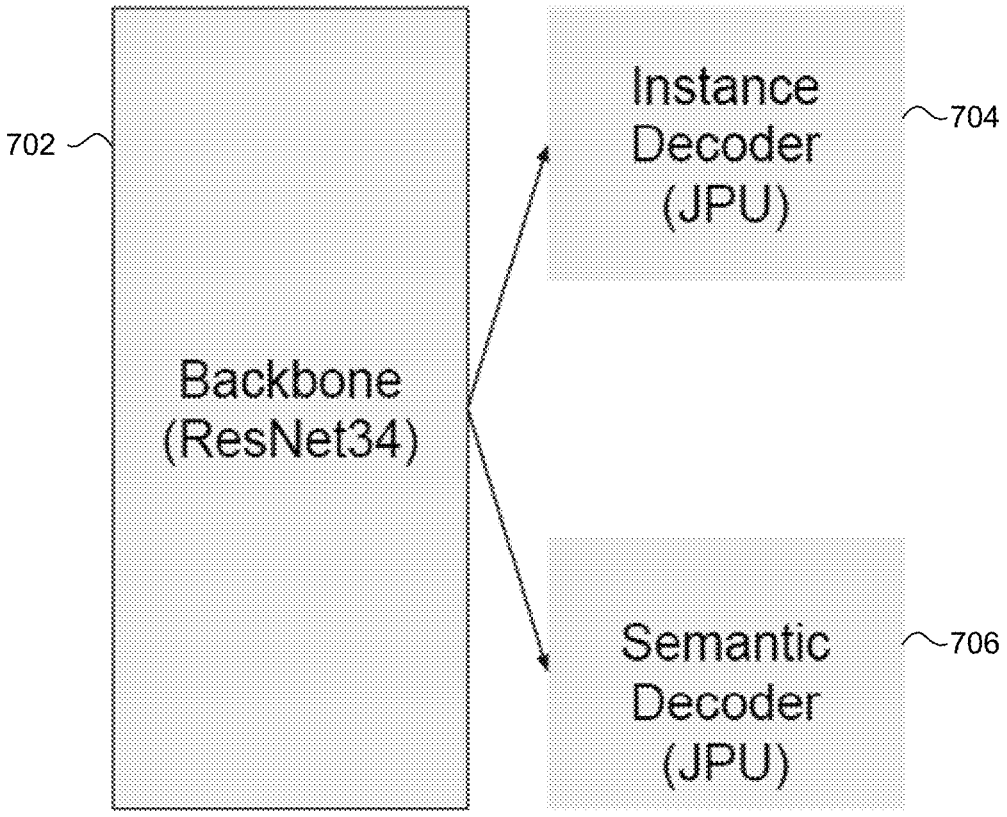
FIG. 7 illustrates the basic model architecture for the exemplary lane detection model, in accordance with aspects of the disclosure.

FIGS. 5-8 illustrate the architecture for an exemplary lane detection model, in accordance with aspects of the disclosure. FIG. 5 illustrates the exemplary lane detection model, in accordance with aspects of the disclosure. In at least one embodiment, the lane detection model may be a convolutional neural network that is trained to predict different properties for each pixel in the BEV image. FIG. 6 illustrates example input channels for the exemplary lane detection model, in accordance with aspects of the disclosure. As shown in the figure, example inputs for the exemplary lane detection model may include a BEV image of a roadway (3 channels) 602, a lidar intensity mask (1 channel) 604, a pose raster of vehicle trajectories (2 channels) 606, and a drivable area (1 channel) 608. The lidar intensity mask 604, pose raster of vehicle trajectories 606, and drivable area 608 may correspond to the same roadway location depicted in the BEV image 602. In at least one embodiment, the BEV image 602, lidar intensity mask 604, pose raster of vehicle trajectories 606, and drivable area 608 may be combined to form an eight channel input for the lane detection model. FIG. 7 illustrates the basic model architecture for the exemplary lane detection model, in accordance with aspects of the disclosure. As shown in the figure, the lane detection model may comprise a backbone network 702, an instance decoder 704, and a semantic decoder 706. In some embodiments, the backbone network 702 may extract multi-level feature maps that encode semantic information from the eight channel input. The instance decoder 704 and semantic decoder 706 may further perform joint pyramid upsampling of the multi-level feature maps previously extracted by the backbone network 702.

Figure 8:
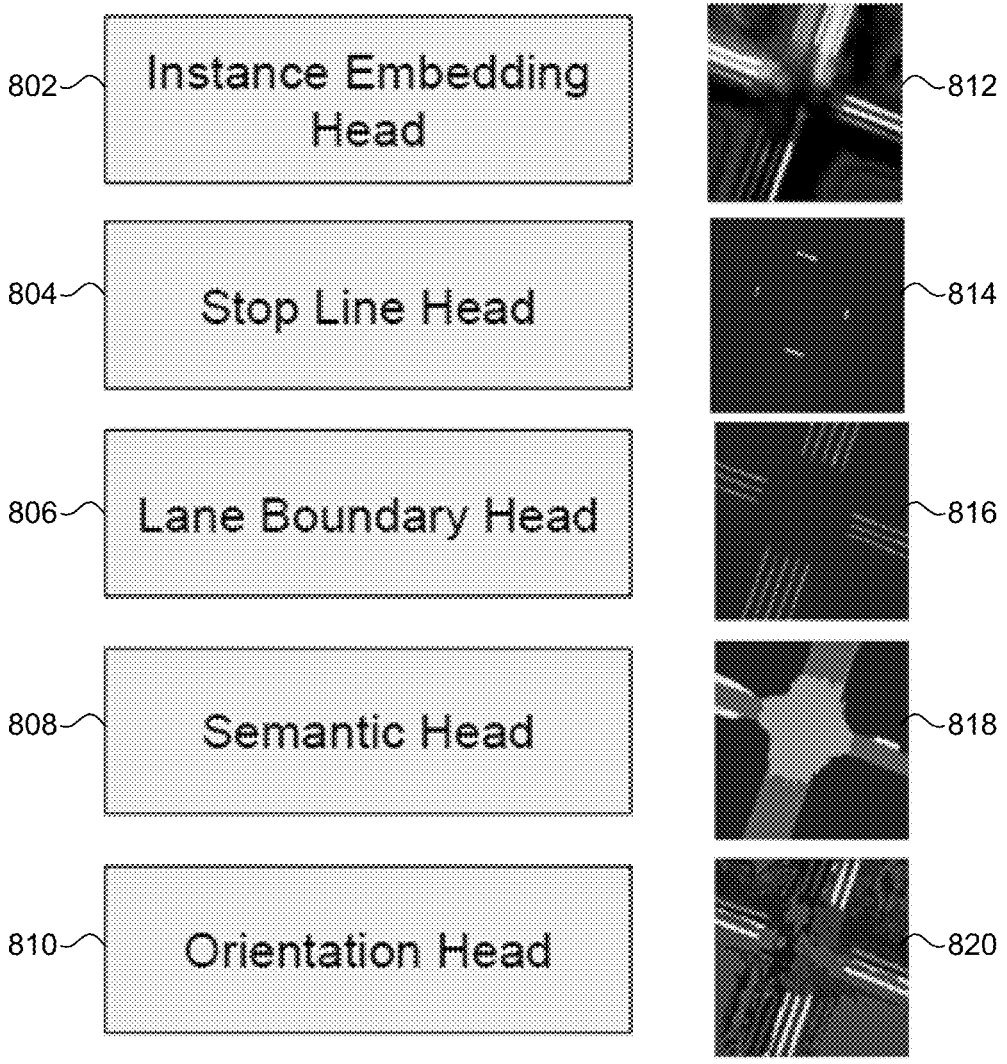
FIG. 8 illustrates the model heads of the exemplary lane detection model, in accordance with aspects of the disclosure.

FIG. 8 illustrates the model heads of the exemplary lane detection model, in accordance with aspects of the disclosure. A model head for a neural network may generate a prediction or segmented mask based on the multi-level feature maps. As shown in the figure, the lane detection model may include an instance embedding head 802, a stop line head 804, a lane boundary head 806, a semantic head 808, and an orientation head 810. The instance embedding head 802 may generate a segmented mask that highlights pixels belonging to identified lane instances. Image 812 displays an example output of the instance embedding head 802. The stop line head 804 may generate a segmented mask that highlights pixels belonging to lane stops. Image 814 displays an example output of the stop line head 804. The lane boundary head 806 may generate a segmented mask that highlights pixels belonging to the boundary lines of the driving lanes. Image 816 displays an example output of the lane boundary head 806. The semantic head 808 may generate a segmented mask that highlights pixels that are classified as belonging to a lane (e.g., the darker gray areas), intersection (e.g., the lighter gray areas), and non-drivable area (e.g., the black areas). Image 818 displays an example output of the semantic head 808. The orientation head 810 may generate a segmented mask that indicates one or more directions for the boundary lines identified in the BEV image. Image 820 displays an example output of the orientation head 820.

FIG. 9 illustrates a flow chart of example method 900 for obtaining feature information in a BEV image, in accordance with aspects of the disclosure. The method 900 may begin at block 902, which may include partitioning the BEV image into parcels comprising a predetermined number of pixels. Block 904 of the method 900 may include retrieving a parcel from the plurality of parcels generated at block 902.

Block 906 of the method 900 may include selecting a pixel in the parcel of the BEV image.

After selecting a pixel in the parcel, the method 900 may include using a first neural network to predict different properties for the pixel. As previously explained, the first neural network may be trained to predict the different properties for the pixel using any one or more known machine learning techniques. However, since lane boundaries are not well-defined in intersection areas, the first neural network is explicitly trained to not predict lane boundaries in intersections. Block 908 of the method 900 may include the first neural network predicting whether the pixel is part of a boundary line of the driving lane. Predicting if the pixel is part of a boundary line may also include the first neural network predicting whether the pixel is classified as part of a lane, intersection, or non-drivable area. Block 910 of the method 900 may include the first neural network assigning a label to the pixel indicating that the pixel is part of the boundary line of the driving lane. Block 912 of the method 900 may include the first neural network generating a coarse driving direction prediction for the pixel. Predicting a coarse driving direction for a pixel may further include the first neural network generating a probability for each direction bin in a set of direction bins and identifying the coarse driving direction based on a comparison of the two direction bins with the highest probabilities. In at least one embodiment, the set of direction bins may comprise eight direction bins organized in 45 degree increments.

At decision diamond 914, the method 900 may include determining whether the pixel selected at block 906 is the last pixel in the parcel. If not, the method 900 may include selecting the next pixel in the parcel and repeating the steps outlined at blocks 908, 910, 912 and decision diamond 914. The method 900 may include repeating this loop until the neural network has generated property predictions for every pixel in the parcel. If the selected pixel is the last pixel in the parcel, the method 900 may include proceeding to decision diamond 916.

At decision diamond 916, the method 900 may include determining whether the parcel retrieved at block 904 is the parcel in the image. If not, the method 900 may include retrieving the next parcel in the image and repeating the steps outlined at blocks 906, 908, 910, 912, and decision diamonds 914 and 916. The method 900 may include repeating this loop until every parcel has been retrieved and examined by the neural network. If the selected parcel is the last parcel in the BEV image, the method 900 may include proceeding to block 918. Block 918 of the method 900 may include constructing a line for each boundary line of a driving lane based on the pixels previously labeled at block 908.

Figure 10:
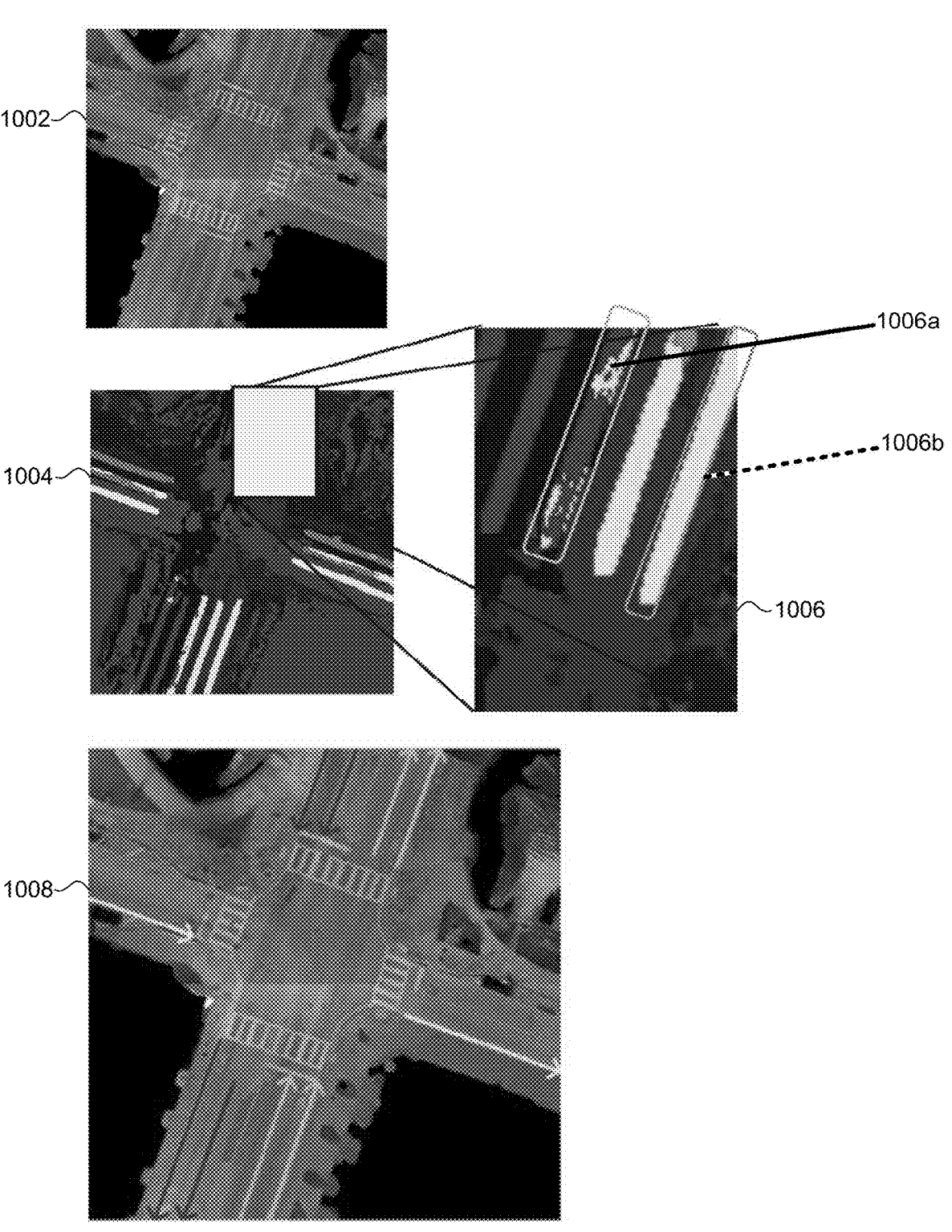
FIG. 10 illustrates an example method for estimating the driving direction of the boundary lines of a driving lane based on outputs produced by the model heads of the exemplary lane detection model, in accordance with aspects of the disclosure.

FIG. 10 illustrates an example method for estimating the driving direction for the boundary lines of a driving lane based on outputs produced by the model heads of the exemplary lane detection model, in accordance with aspects of the disclosure. The method for estimating a driving direction for a boundary line may include aggregating the coarse driving direction predictions for the labeled pixels on the boundary line. Image 1002 displays the refined lane boundaries. As shown in image 1004, the computing device may assign a color to each labeled pixel on the boundary line according to its predicted coarse driving direction. The assigned color(s) may indicate the most likely direction. For example, as shown in image 1006*a*, speckled areas may indicate that the probabilities for the two most likely directions for the line are similar. Accordingly, in this case, the boundary line is a lane divider separating two lanes going in different directions. However, if the probabilities are highly different, the direction of the boundary line is the direction associated with the greatest probability. For example, as shown in image 1006*b*, solid color areas may indicate the most likely direction for the boundary line. Furthermore, as shown in image 1008, the computing device may assign a direction indicator (e.g., color and/or arrow) to each boundary line during post processing.

FIG. 11 illustrates an example method for creating lane segments based on outputs produced by the model heads of the exemplary lane detection model, in accordance with aspects of the disclosure. Image 1102 displays the output from the lane boundary head of the first neural network. As shown in image 1102, the first neural network constructs the boundary lines of the lanes based on previously labeled pixels. Image 1104 displays the output from the orientation head of the first neural network. Image 1106 displays the output from the semantic head of the first neural network. As shown in image 1106, the first neural network predicts which pixels are classified as driving lanes (e.g., the darker gray areas), intersection (e.g., the lighter gray areas), and non-drivable (e.g., the black areas). Image 1108 displays the output from the stop line head of the first neural network model. Image 1110 further displays the detected lane segments overlaid onto the original input BEV image. During post processing, the computing device may create a lane segment by combining the constructed boundary lines and aligning lane ends with the detected stop lines.

Figure 12:
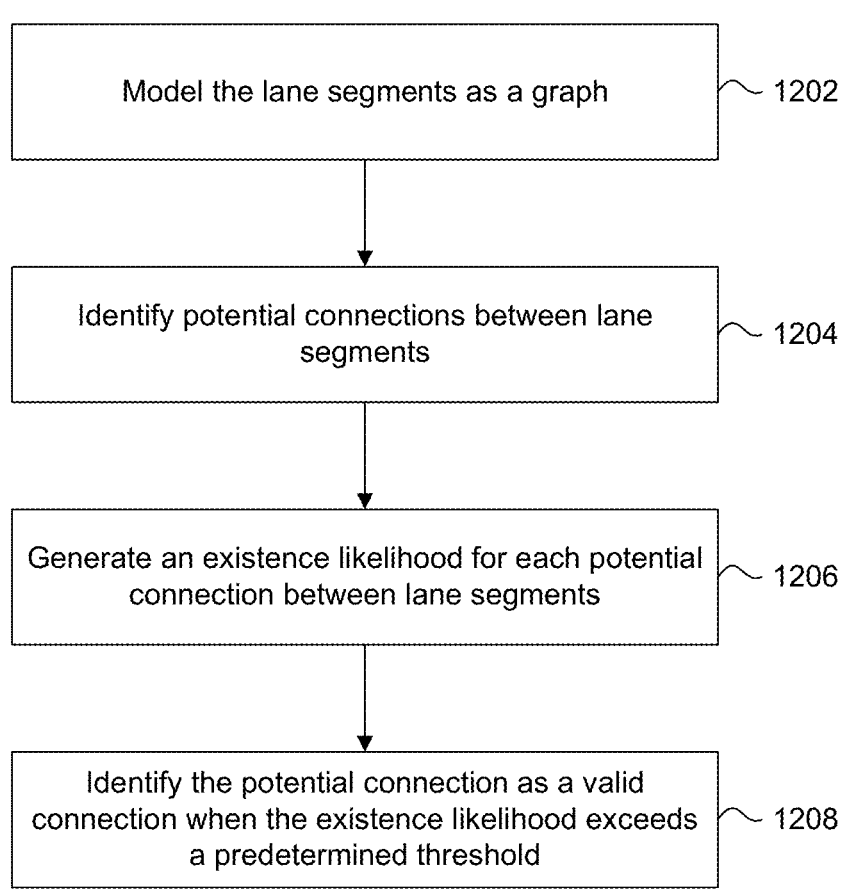
FIG. 12 illustrates a flow chart of an example method for predicting lane segments in an intersection using a lane graph prediction model, in accordance with aspects of the disclosure.

FIG. 12 illustrates a flow chart of example method 1200 for predicting lane segments in an intersection using a lane graph prediction model, in accordance with aspects of the disclosure. The lane graph prediction model may be a second neural network that treats roads and lanes as a graph rather than operating in the image space. Classical object detection, segmentation, and other models that operate in the image space are not suitable for detecting lane segments in an intersection because intersections include different lanes that can be in the same location or overlap. However, for models operating in the image space, there can be no overlap between objects such as lanes. By treating roads and lanes as a graph, the lane graph prediction model may create an accurate model of an intersection by accounting for overlapping lane segments.

The method 1200 may begin at block 1202, which may include the lane graph prediction model modelling the lane segments as a graph. Modelling lane segments as a graph may include the lane graph prediction model creating a graph where lane segments that were previously detected by the lane detection model are nodes and lane segments in the intersection are edges. Block 1204 of the method 1200 may include the lane graph prediction model identifying potential connections between lane segments. Identifying potential connections between lane segments may include the lane graph prediction model initially creating a fully connected graph. Block 1206 of the method 1200 may include the lane graph prediction model generating an existence likelihood for each connection between the lane segments in the graph. Block 1208 of the method 1200 may include the lane graph prediction model identifying a potential connection as a valid connection when the existence likelihood exceeds a predetermined threshold. Identifying a potential connection as a valid connection may include the lane graph prediction model removing one or more potential connections from the graph that do not have an existence likelihood greater than the predetermined threshold.

Figure 13:
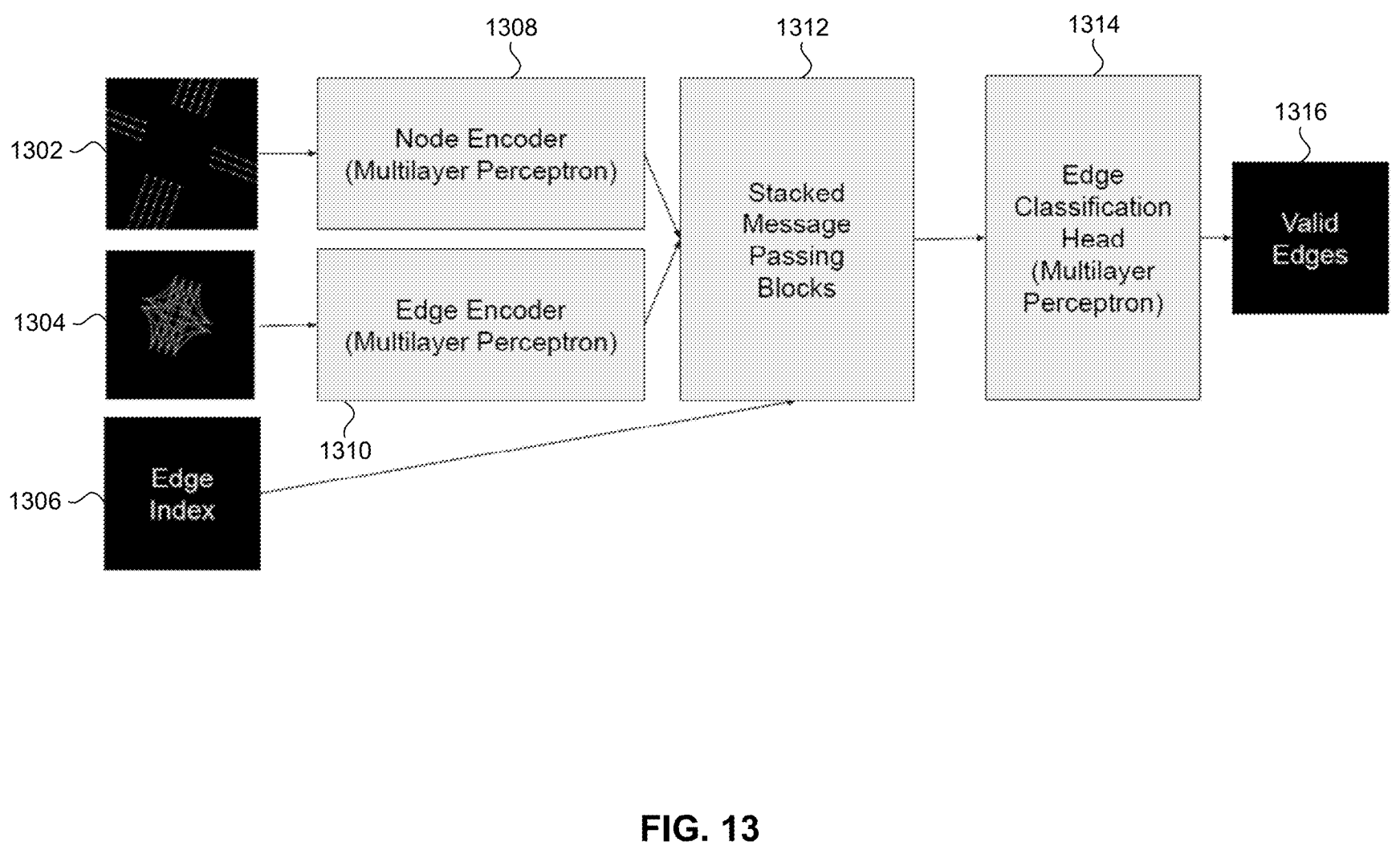

FIG. 13 illustrates an exemplary architecture for the lane graph prediction model, in accordance with aspects of the disclosure. Inputs to the lane graph prediction model may include node features 1302, edge features 1304, and an edge index 1306. Node features 1302 may be extracted for each previously detected lane segment. Node features 1302 may include a rough geometrical outline of a lane segment represented by five points for the left and right lane boundary lines, an orientation of the lane represented by five directional vectors linearly spaced over the lane, and flags indicating if the lane has right or left neighbor lane segments going in the same direction. Edge features 1304 may be extracted for each potential edge in the graph. Edge features 1304 may include a cubic spline that is fitted between endpoints of the lane segments connected by an edge and a curvature that is calculated on each of the 10 points along the spline. Furthermore, an edge index 1306 may comprise a list of (i, j) edge tuples describing the graph structure, wherein i is a source node of an edge and j is a destination node of an edge.

The lane graph prediction model may comprise a node encoder 1308, an edge encoder 1310, stacked message passing blocks 1312, and an edge classification head 1314. Node encoder 1308 may be a multilayer perceptron that encodes node features 1302. Edge encoder 1310 may be a multilayer perceptron that encodes edge features 1304. A multilayer perceptron is a feedforward artificial neural network comprising multiple layers that may include an input, an output layer, and at least one hidden layer. Stacked message passing blocks 1312 may receive the edge index 1306 as well as the encoded node features and encoded edge features as input. Stacked message passing blocks 1312 may be a message passing network that learns to combine deep features into high-order information across the graph. Edge classification head 1314 may be a multilayer perceptron that uses output from the stacked message passing blocks 1312 to generate an existence likelihood for each edge in the edge index 1306.

Figure 14:
FIG. 14 illustrates an example output of the lane graph prediction model, in accordance with aspects of the disclosure.

FIG. 14 illustrates example output 1400 of the lane graph prediction model, in accordance with aspects of the disclosure. The lane graph prediction model may identify both potential and valid connections for all lane segments in an intersection. As shown in the figure, dotted lines may indicate potential connections and solid lines may indicate valid connections. The lane graph prediction model may apply a threshold to each edge in the edge index in order to identify one or more valid connections. The lane graph prediction model may further determine that all edges with an existence likelihood greater than the threshold are valid connections.

Figure 15:
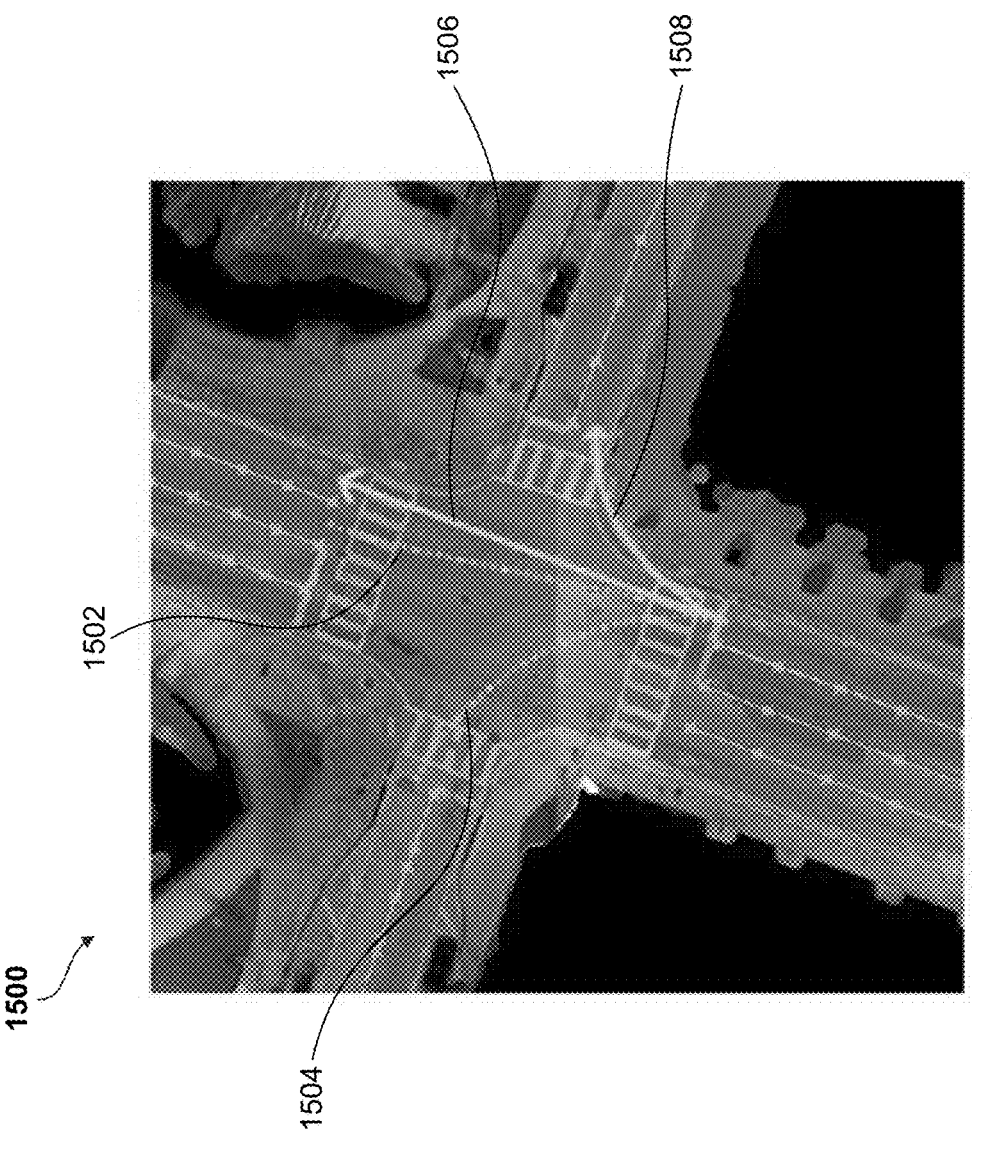
FIG. 15 illustrates an example output of the lane graph prediction model for one exemplary lane segment in an intersection, in accordance with aspects of the disclosure.

FIG. 15 illustrates example output 1500 of the lane graph prediction model for one exemplary lane segment in an intersection, in accordance with aspects of the disclosure. The lane graph prediction model may identify two potential connections (1502 and 1504) and two valid connections (1506 and 1508) between the exemplary lane segment and other lane segments in the intersection. In this example, the lane graph prediction model may discard the two potential connections 1502 and 1504 because it learned that AVs should perform left turns using the leftmost lane segment and avoid changing lane segments in an intersection.

Figure 16:
FIG. 16 illustrates an exemplary result of the example method for detecting lane segments used to create HD maps, in accordance with aspects of the disclosure.

FIG. 16 illustrates an exemplary result 1600 of the example method for detecting lane segments used to create HD maps, in accordance with aspects of the disclosure. During post processing, a computing device may create lane segments in an intersection based on the valid connections identified by the lane graph prediction model. The computing device may deploy different heuristics to discard one or more of the valid connections identified by the lane graph prediction model. The different heuristics may include requirements that the intersection segments be contained inside the drivable area and that the intersection segments be classified as lane or intersection in the semantic mask. The computer device may also use the lane segments adjacent to the intersection to derive start and end points of the lane segments in the intersection. Furthermore, the computing device may construct the lane segments in the intersection using Bezier curves that approximate a circle.

Figure 17:
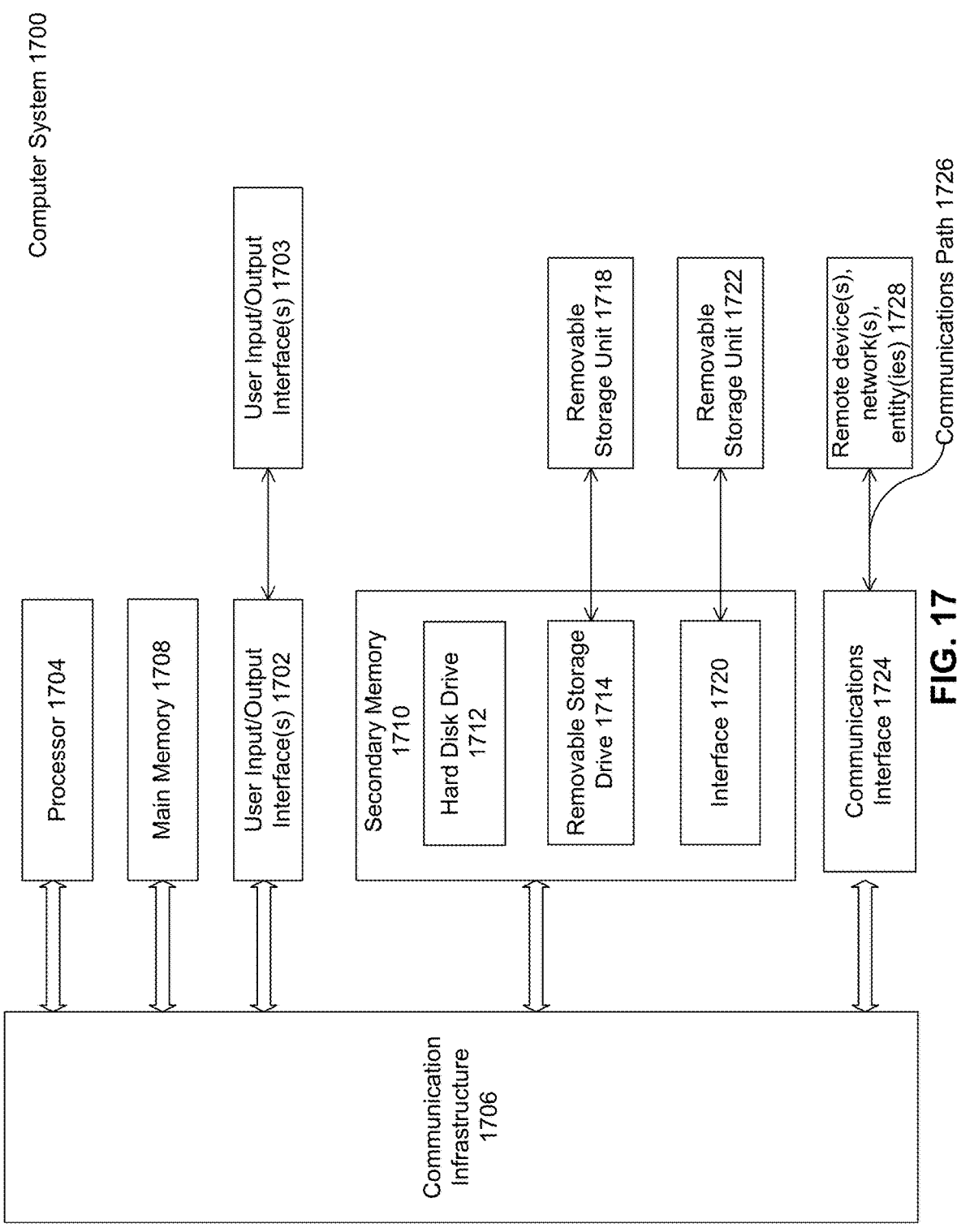
FIG. 17 illustrates an example computer system useful for implementing various embodiments.

Various embodiments can be implemented, for example, using one or more computer systems, such as computer system 1700 shown in FIG. 17. Computer system 1700 can be any computer capable of performing the functions described herein.

Computer system 1700 includes one or more processors (also called central processing units, or CPUs), such as a processor 1704. Processor 1704 is connected to a communication infrastructure or bus 1706.

One or more processors 1704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1700 also includes user input/output device(s) 1703, such as monitors, keyboards, pointing devices, etc., that communicate with communication infrastructure 1706 through user input/output interface(s) 1702.

Computer system 1700 also includes a main or primary memory 1708, such as random access memory (RAM). Main memory 1708 may include one or more levels of cache. Main memory 1708 has stored therein control logic (i.e., computer software) and/or data.

Computer system 1700 may also include one or more secondary storage devices or memory 1710. Secondary memory 1710 may include, for example, a hard disk drive 1712 and/or a removable storage device or drive 1714. Removable storage drive 1714 may be a floppy disk drive, a magnetic tape drive, a compact disk drive, an optical storage device, tape backup device, and/or any other storage device/drive.

Removable storage drive 1714 may interact with a removable storage unit 1718. Removable storage unit 1718 includes a computer usable or readable storage device having stored thereon computer software (control logic) and/or data. Removable storage unit 1718 may be a floppy disk, magnetic tape, compact disk, DVD, optical storage disk, and/any other computer data storage device. Removable storage drive 1714 reads from and/or writes to removable storage unit 1718 in a well-known manner.

According to an exemplary embodiment, secondary memory 1710 may include other means, instrumentalities or other approaches for allowing computer programs and/or other instructions and/or data to be accessed by computer system 1700. Such means, instrumentalities or other approaches may include, for example, a removable storage unit 1722 and an interface 1720. Examples of the removable storage unit 1722 and the interface 1720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1700 may further include a communication or network interface 1724. Communication interface 1724 enables computer system 1700 to communicate and interact with any combination of remote devices, remote networks, remote entities, etc. (individually and collectively referenced by reference number 1728). For example, communication interface 1724 may allow computer system 1700 to communicate with remote devices 1728 over communications path 1726, which may be wired and/or wireless, and which may include any combination of LANs, WANs, the Internet, etc. Control logic and/or data may be transmitted to and from computer system 1700 via communication path 1726.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1700, main memory 1708, secondary memory 1710, and removable storage units 1718 and 1722, as well as tangible articles of manufacture embodying any combination of the foregoing. Such control logic, when executed by one or more data processing devices (such as computer system 1700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 17. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:

classifying, by a neural network on one or more computing devices, a pixel of an image including a birds eye view (BEV) of a location as belonging to a driving lane;

assigning, based on the pixel being determined to belong to a first boundary line of the driving lane by the neural network on the one or more computing devices, a label indicating the pixel as part of the first boundary line of the driving lane;

constructing, by the one or more computing devices and based on the labeled pixel and one or more additional labeled pixels as part of the first boundary line of the driving lane, a first line drawing of the first boundary line of the driving lane;

creating, using the one or more computing devices, a lane segment based on a combination of the first line drawing of the first boundary line of the driving lane and a second line drawing of a second boundary line of the driving lane; and determining, by a second neural network on the one or more computing devices, whether to connect the lane segment to a second lane segment in an intersection, wherein the second neural network is separated from the neural network, wherein the determining whether to connect the lane segment to the second lane segment in the intersection further includes, generating, by the second neural network on the one or more computing devices, an existence probability for an identified potential connection between the lane segment and the second lane segment; and verifying, by the second neural network on the one or more computing devices, the identified potential connection is a valid connection based on a comparison of the existence probability to a predetermined threshold.

2. The method of claim 1, further comprising:

partitioning, using the one or more computing devices, the image into a plurality of parcels, wherein each parcel of the plurality of parcels comprises a same predetermined number of pixels, wherein the pixel and the one or more additional labeled pixels are selected from a parcel of the plurality of parcels.

3. The method of claim 1, further comprising:

aligning, by the one or more computing devices, the first line drawing of the first boundary line and the second line drawing of the second boundary line of the driving lane with a detected lane stop.

4. The method of claim 1, further comprising:

predicting, by the neural network on the one or more computing devices, a coarse driving direction for each of the labeled pixel and the one or more additional labeled pixels; and estimating, based on the predicted coarse driving directions of the labeled pixel and the one or more additional labeled pixels by the neural network on the one or more computing devices, a direction for each of the first line drawing of the first boundary line and the second line drawing of the second boundary line of the driving lane.

5. The method of claim 4, wherein predicting the coarse driving direction for each of the labeled pixel and the one or more additional labeled pixels further comprises:

generating, by the neural network on the one or more computing devices, probabilities for a plurality of direction bins defining a plurality of directions separated by at least one increment; and identifying, by the neural network on the one or more computing devices, the coarse driving direction based on a comparison of two direction bins of the plurality of direction bins with the highest probabilities.

6. The method of claim 1, wherein the second neural network is configured to operate outside of an image space and treat lanes and roads as a graph.

7. A non-transitory computer-readable medium storing instructions that, when executed by one or more processors, causes the one or more processors to perform operations comprising:

classifying, by a neural network, a pixel of an image including a birds eye view (BEV) of a location as belonging to a driving lane;

assigning, based on the pixel being determined to belong to a first boundary line of the driving lane by the neural network, a label indicating the pixel as part of the first boundary line of the driving lane;

constructing, based on the labeled pixel and one or more additional labeled pixels as part of the first boundary line of the driving lane, a first line drawing of the first boundary line of the driving lane;

creating a lane segment based on a combination of the first line drawing of the first boundary line of the driving lane and a second line drawing of a second boundary line of the driving lane; and determining, by a second neural network, whether to connect the lane segment to a second lane segment in an intersection, wherein the second neural network is separated from the neural network, wherein the determining whether to connect the lane segment to the second lane segment in the intersection further includes, generating, by the second neural network, an existence probability for an identified potential connection between the lane segment and the second lane segment; and verifying, by the second neural network, the identified potential connection is a valid connection based on a comparison of the existence probability to a predetermined threshold.

8. The non-transitory computer-readable medium of claim 7, wherein the operations further comprise:

partitioning the image into a plurality of parcels, wherein each parcel of the plurality of parcels comprises a same predetermined number of pixels, wherein the pixel and the one or more additional labeled pixels are selected from a parcel of the plurality of parcels.

9. The non-transitory computer-readable medium of claim 7, wherein the operations further comprise:

aligning the first line drawing of the first boundary line and the second line drawing of the second boundary line of the driving lane with a detected lane stop.

10. The non-transitory computer-readable medium of claim 7, wherein the operations further comprise:

predicting, by the neural network, a coarse driving direction for each of the labeled pixel and the one or more additional labeled pixels; and estimating, based on the predicted coarse driving directions of the labeled pixel and the one or more additional labeled pixels by the neural network, a direction for each of the first line drawing of the first boundary line and the second line drawing of the second boundary line of the driving lane.

11. The non-transitory computer-readable medium of claim 10, wherein predicting a coarse driving direction for each of the labeled pixel and the one or more additional labeled pixels further comprises:

generating, by the neural network, probabilities for a plurality of direction bins defining a plurality of directions separated by at least one increment; and identifying, by the neural network, the coarse driving direction based on a comparison of two direction bins of the plurality of direction bins with the highest probabilities.

12. A system, comprising:

one or more processors; and a memory communicatively coupled to the one or more processors, wherein the memory stores instructions that, when executed by the one or more processors, cause the one or more processors to perform operations comprising:

classifying, by a neural network, a pixel of an image including a birds eye view (BEV) of a location as belonging to a driving lane, assigning, based on the pixel being determined to belong to a first boundary line of the driving lane by the neural network, a label indicating the pixel as part of the first boundary line of the driving lane, constructing, based on the labeled pixel and one or more additional labeled pixels as part of the first boundary line of the driving lane, a first line drawing of the first boundary line of the driving lane, creating a lane segment based on a combination of the first line drawing of the first boundary line of the driving lane and a second line drawing of a second boundary line of the driving lane, and determining, by a second neural network, whether to connect the lane segment to a second lane segment in an intersection, wherein the second neural network is separated from the neural network, wherein the determining whether to connect the lane segment to the second lane segment in the intersection further includes, generating, by the second neural network, an existence probability for an identified potential connection between the lane segment and the second lane segment; and verifying, by the second neural network, the identified potential connection is a valid connection based on a comparison of the existence probability to a predetermined threshold.

13. The system of claim 12, wherein the operations further comprise:

aligning the first line drawing of the first boundary line and the second line drawing of the second boundary line of the driving lane with a detected lane stop.

14. The system of claim 12, wherein the operations further comprise:

predicting, by the neural network, a coarse driving direction for each of the labeled pixel and the one or more additional labeled pixels; and estimating, based on the predicted coarse driving directions of the labeled pixel and the one or more additional labeled pixels by the neural network, a direction for each of the first line drawing of the first boundary line and the second line drawing of the second boundary line of the driving lane.

15. The system of claim 14, wherein predicting a coarse driving direction for each of the labeled pixel and the one or more additional labeled pixels further comprises:

generating, by the neural network, probabilities for a plurality of direction bins defining a plurality of directions separated by at least one increment; and identifying, by the neural network, the coarse driving direction based on a comparison of two direction bins of the plurality of direction bins with the highest probabilities.

* * * * *